(12) United States Patent
Francavilla

(10) Patent No.: US 9,488,851 B2
(45) Date of Patent: Nov. 8, 2016

(54) PROCESS AND APPARATUS FOR MAKING DECORATED EYEGLASSES FRAMES

(75) Inventor: Luigi Francavilla, Agordo (IT)

(73) Assignee: LUXOTTICA S.R.L., Agordo (IT)

( * ) Notice: Subject to any disclaimer, the term of this patent is extended or adjusted under 35 U.S.C. 154(b) by 232 days.

(21) Appl. No.: 14/006,247

(22) PCT Filed: Mar. 14, 2012

(86) PCT No.: PCT/IB2012/051213
§ 371 (c)(1),
(2), (4) Date: Sep. 19, 2013

(87) PCT Pub. No.: WO2012/127367
PCT Pub. Date: Sep. 27, 2012

(65) Prior Publication Data
US 2014/0009733 A1    Jan. 9, 2014

(30) Foreign Application Priority Data
Mar. 21, 2011    (IT) .............................. BO2011A0138

(51) Int. Cl.
| G02C 11/02 | (2006.01) |
| G02C 5/14 | (2006.01) |
| B29C 45/14 | (2006.01) |
| B29D 12/02 | (2006.01) |
| B29C 51/10 | (2006.01) |
| G02C 5/00 | (2006.01) |
| B29C 45/16 | (2006.01) |
| B29L 12/00 | (2006.01) |
| B29C 51/02 | (2006.01) |

(52) U.S. Cl.
CPC ........... *G02C 5/14* (2013.01); *B29C 45/14221* (2013.01); *B29C 45/14688* (2013.01); *B29C 51/10* (2013.01); *B29D 12/02* (2013.01); *G02C 5/008* (2013.01); *B29C 51/02* (2013.01); *B29C 2045/14237* (2013.01); *B29C 2045/14286* (2013.01); *B29C 2045/14721* (2013.01); *B29C 2045/1673* (2013.01); *B29C 2791/001* (2013.01); *B29C 2791/006* (2013.01); *B29C 2793/009* (2013.01); *B29L 2012/005* (2013.01); *G02C 2200/14* (2013.01)

(58) Field of Classification Search
CPC ....... G02C 11/00; G02C 11/02; B29C 51/02; B29C 2045/14237; B29C 2045/14286; B29C 2045/14721; B29C 2045/1673; B29C 2791/001; B29C 2791/006; B29C 2793/009; B29L 2012/005
USPC .................................... 351/41, 51, 154, 178
See application file for complete search history.

(56) References Cited

U.S. PATENT DOCUMENTS

| 3,517,415 | A | 6/1970 | McGrath et al. |
| 5,800,759 | A * | 9/1998 | Yamazaki ......... B29C 45/14008 264/163 |
| 2002/0100387 | A1 | 8/2002 | Churchwell |
| 2005/0098924 | A1 | 5/2005 | Kauppi et al. |
| 2007/0081786 | A1 * | 4/2007 | Burnett ............... B29C 45/1418 385/147 |
| 2009/0174860 | A1 * | 7/2009 | Lam ....................... G02C 5/008 351/51 |

FOREIGN PATENT DOCUMENTS

| CN | 101191908 A | 6/2008 |
| KR | 2010 0090130 A | 8/2010 |
| WO | 92/06835 A1 | 4/1992 |
| WO | 02/060667 A1 | 8/2002 |

* cited by examiner

*Primary Examiner* — Scott J Sugarman
*Assistant Examiner* — Robert E Tallman
(74) *Attorney, Agent, or Firm* — Pearne & Gordon LLP

(57) ABSTRACT

A process for making eyeglasses frames (1), where at least one front rim (2) or a pair of sidepieces (3) of the eyeglasses frame (1) is decorated, comprises the steps of decorating a film, inserting the film into the mould (4) and injection moulding the front rim (2) and/or the sidepieces (3) with the film applied to it/them; before the step of injection moulding the front rim (2) and/or the sidepieces (3), there is a step of thermoforming and trimming the film to form and shape the film according to a profile corresponding to a wall (7) of the mould (4), in such a way that the film (5) inserted in the mould is shaped like a surface of the front rim (2) and/or of the sidepieces (3) to be formed.

18 Claims, 6 Drawing Sheets

PROCESS AND APPARATUS FOR MAKING DECORATED EYEGLASSES FRAMES

TECHNICAL FIELD

This invention relates to a process and an apparatus for making decorated eyeglasses frames.

More specifically, this process and the related apparatus are used in the field of technology for the in-mould decoration of eyeglasses frames.

Stato Della Tecnica

Frames for eyeglasses are composed of a front rim and two supporting sidepieces which are hinged to the rim at one end of them by respective joining elements.

At present, one of the methods used to make decorated frames for eyeglasses involves the use of injection moulding technology, especially if the frame is made from a plastic material.

More specifically, a mould is used which is divided into two parts (lower and upper) movable towards and away from each other and shaped to reproduce the negative shape of the eyeglasses frame (rim or sidepieces).

The material in the liquid state is injected into the mould and, upon cooling, takes the shape of the mould.

Based on this process, to obtain a decoration at least on a surface of the rim or of the sidepieces, a method known in the jargon of the trade as "in-mould labelling", or IML, is used.

A mould which uses this method is known from patent WO 92/06835 which describes the positioning of a portion of decorated film inside the mould.

The mould used for this type of solution is a dedicated, unencumbered mould which allows an unshaped piece of film to be placed along the opening plane of the mould itself. The film is given the required shape during injection of the plastic material (by the effect of the injected material itself).

This type of process is not free of disadvantages, however.

First of all, the fact that the portion of decorated film placed in the mould is larger in area than the working surface that shapes the eyeglasses frame, combined with the fact that shaping occurs directly in the mould, causes wrinkling and damage to the decorated film itself when the mould is closed and the plastic material injected into it. That in turn means a high rejection rate or, in any case, the need for highly invasive post process operations on the frame and decoration.

It should also be noted that any post-injection cutting technology would involve a high risk of damaging the decorated film already applied to the eyeglasses frame.

Lastly, the prior art solution just described would require existing moulds already in use to be adapted to allow the film to be placed along the mould dividing plane.

AIMS OF THE INVENTION

This invention has for an aim to provide a process for making decorated eyeglasses frames which overcomes the above-mentioned disadvantages of the prior art.

A further aim of this invention is to provide an apparatus for making decorated eyeglasses frames which overcomes the above-mentioned disadvantages of the prior art without using moulds dedicated for the purpose.

More specifically, this invention has for an aim to provide a process and an apparatus for making decorated eyeglasses frames and which are capable of obtaining an eyeglasses frame of high aesthetic quality in a reduced manufacturing time.

A further aim of the invention is to propose a process and an apparatus for making eyeglasses frames and which are capable of obtaining a decorated eyeglasses frame with a high production acceptance rate, without the risk of damage to the decorated film and without the need for supplementary, post-injection operations on the film.

These aims are fully achieved by the process and the apparatus according to this invention as characterized in the appended claims.

More specifically, the process for making eyeglasses frames where the front rim or a pair of sidepieces is decorated, comprises the steps of decorating a film, inserting the film into the mould and injection moulding the front rim and/or the sidepieces with the film applied to it/them.

It should be noted that decoration means the act of applying a decorative pattern or embellishment on the film and/or the film decoration itself.

According to the invention, before the step of injection moulding the front rim and/or the sidepieces, there is a step of thermoforming the film to give the film the shape of a profile corresponding to a wall of the mould, and a step of trimming in such a way that the film inserted in the mould is formed and shaped like a surface of the front rim and/or of the sidepieces to be formed.

It should be noted that moulding the front rim and/or the sidepieces may also be performed in two distinct steps, one after the other.

More specifically, in a first moulding step, a first layer of the front rim and/or of the sidepieces is formed, and in a second moulding step, a second layer of the front rim and/or of the sidepieces is formed, so that the first and second layers, when combined, form the whole front rim and/or sidepieces.

In such a case, the film (which is suitably decorated and shaped) is placed in the mould after the first moulding step and before the second moulding step.

In practice, in the second moulding step, the first layer of the front rim and/or of the sidepieces is positioned in the mould and the film is laid over the first layer. At this point, the second moulding step is performed in such a way that the decorated film is interposed between the two layers of the front rim and/or sidepieces.

Preferably, at least one of the two layers of the front rim and/or sidepieces is transparent (more preferably, both layers are transparent). Thus, the decorated film inside the front rim and/or the sidepieces is visible from the outside.

It should be noted that in this case, the film is shaped (by thermoforming and trimming) according to the top surface of the first layer of the front rim and/or sidepieces which, for the purposes of this invention, constitutes the wall of the mould which receives the film during the second moulding step.

Hence, the film is shaped (by thermoforming and trimming) according to a predetermined profile which, if (and only if) the front rim and/or the sidepieces are formed in a single moulding step, coincides with the shape of one of the outside faces of the selfsame front rim and/or sidepieces.

Preferably, the predetermined profile is defined by a three-dimensional surface.

Preferably, the step of thermoforming occurs before the step of inserting the film in the mould.

Preparation by thermoforming and shaping the piece of film before inserting the film in the mould simplifies moulding operations and allows forming of the portion of film in order to adapt it to the shape of the mould which is, in any case, not flat.

Forming means giving the film a predetermined shape (three-dimensional, that is to say, having a predetermined curvature).

This forming is made particularly effective by heating the film (which makes it particularly soft): hence the term "thermoforming".

Shaping means trimming a piece of the film to form a predetermined blank which adapts to the shape of the mould.

Thermoforming also produces a portion of film which is free of irregularities and which, at the end, gives a ready finished eyeglasses frame in the mould, eliminating the need for subsequent machining to give it the right shape on the frame side.

This thermoforming treatment also makes it possible to make eyeglasses with different shapes and with high curvature radiuses.

Preferably, the step of thermoforming the film is performed after the step of decorating the film.

This procedure makes it possible to prevent dimensional variations on the film subjected to decorative heating and cooling treatments which cause shrinkage or poorly defined graphics, especially in the zones with high curvature radius.

Moreover, this procedure also reduces the costs of the decoration and thermoforming steps.

According to the invention, the thermoforming step comprises preparing a contact element shaped to match the wall of the mould, positioning a piece of film on the contact element and shaping the piece of film by trimming the parts of the film projecting past the edges of the punch.

In the embodiment illustrated, the contact element consists of a punch in relief, or male die.

Alternatively, the contact element may consist of a matrix (hollow), or female die.

Shaping the film on the contact element makes it possible to speed up and improve the effectiveness of the thermoforming step according to the design requirements of the part of the eyeglasses frame to be decorated.

Preferably, during the thermoforming of the plastic film portion placed on the punch, the piece of plastic film is heated by irradiation.

Preferably, the part of the film that is heated is the part which is in contact with the contact element.

This operative feature speeds up the forming step because only the part to be formed is heated and no time is wasted heating the entire piece of film.

Preferably, the process also comprises a step of cooling the contact element during the step of thermoforming the piece of film, thus facilitating extraction of the piece of film from the contact element and limiting dimensional variation of the film.

Preferably, the step of decorating the film is performed at high resolution.

The high definition film decoration prevents alteration of the decoration, after it has been applied, due to the stretching the film is subjected to during thermoforming.

Preferably, decoration of the piece of film is accomplished by sublimation.

This decoration technology guarantees anti-scratch properties because the colour penetrates into the film and prevents colour loss during subsequent processing and use (for example, tumbling or etching).

Sublimation also gives the end product an effect of transparency.

Preferably, the film is moulded to the shape of the contact element by generating a negative pressure through suction channels made in the contact element.

Alternatively or in addition to the negative pressure, shape is imparted by blowing a jet of fluid directly on the film positioned on the contact element.

Whatever the case, moulding causes stretching of the piece of film positioned on the contact element.

Preferably, the process also comprises a step of releasing the shaped film portion from the contact element to the mould wall.

More specifically, the mould wall is provided with suction ducts to guarantee adherence of the film portion to the mould wall itself.

The steps of forming the film portion and holding down the film portion using suitable means (suction channels or means for imparting an electrostatic charge to the film) make it possible to increase moulding efficiency, adherence and positioning of the film against contact element and mould wall in such a way as to increase productivity through automation of the steps of forming, applying and releasing the piece of film between the contact element and the mould.

Further, the process comprises a step of automated transporting of the contact element with the shaped film portion on it from a forming station to the mould by manipulating means.

This feature, too, like the ones described above, makes it possible to increase productivity by automating the procedures of transporting and subsequently positioning the film in the mould.

It should be noted that thermoforming and trimming are preferably performed by positioning the film on different contact elements.

Preferably, trimming is performed in a step which follows thermoforming.

More specifically, thermoforming is performed by placing the film on the first contact element, whose profile is the predetermined one but which is slightly larger in size (that is, which has the shape which the film must have during the step of injection whereby the front rim and/or the sidepieces are formed and the decorated film incorporated therein but slightly larger in size).

Film trimming, on the other hand, is performed by placing the film (previously thermoformed) on a second contact element having the predetermined profile and equal in size (that is, which has the shape which the film must have during the step of injection whereby the front rim and/or the sidepieces are formed and the decorated film incorporated therein and being the same in size).

Thus, the first contact element (the one used for thermoforming) is the same in shape and slightly larger in size than the second contact element (the one used for trimming).

This allows trimming to be particularly precise, adapting the shape of the second contact element to the shape of the thermoformed film after the film has cooled and hence shrunk.

It should be noted that it is difficult to predict the way the thermoformed film shrinks because the shape of the thermoformed film is three-dimensional.

The trimmed film portion is then moved away from the second contact element and is left inside the mould.

It should be noted that both the first and the first and the second contact element may be male or female. Also, each is provided with suction means to hold down the film against the contact element or, either alternatively or in combination, with means for directing a flow of fluid at the film.

It should be noted that similar hold-down means are preferably also used in the injection mould.

This invention provides an apparatus for making eyeglasses frames having a front rim and a pair of sidepieces and where the front rim and/or the sidepieces is/are decorated.

The apparatus comprises a film decorating station and an injection mould for forming the eyeglasses frame.

The mould is composed of two parts which can be coupled to each other to make a moulding cavity having a wall on which the film to be applied to the front rim or to the sidepieces is positioned.

It should be noted that the shaping (that is, trimming) means are configured in such a way as to define a three-dimensional line.

Preferably, the trimming means comprise three knives whose cutting edges define closed lines, two of the knives being positioned within a third, outer knife. This makes it possible to shape the frame decorating film As mentioned above, forming and shaping the piece of film before inserting the film in the mould (or it least before injection) simplifies moulding operations and allows forming of the piece of film in order to adapt it to the shape of the mould which is, in any case, not flat.

It should be noted that the contact element is external to the mould and forming occurs before the film is inserted into the mould. If forming is accomplished using as half-mould a matrix (female die) defining the contact element, forming occurs after the film is inserted into the mould but again before injection of the liquid plastic into the mould. Moreover, the formed film is always in contact with a wall of the mould when injection occurs or with a wall of a first layer, previously formed and positioned in the injection mould, of the front rim or of the sidepieces.

Preferably, the forming station is configured to receive pieces of film from the decorating station so that thermoforming is performed on a piece of film that is already decorated.

Preferably, the heating means comprise light sources for thermoforming the piece of film by irradiation.

Preferably, the apparatus comprises means for manipulating the contact element and which automate the transporting of the shaped piece of film placed on the contact element from the forming station to the mould.

Preferably, the apparatus comprises a control unit which is connected to the manipulating means and to the means for generating a negative pressure and which is programmed to coordinate the movement of the contact element from the forming station to the mould with the switching on/off of the means for generating the negative pressure on the contact element and on the bottom wall of the mould.

BRIEF DESCRIPTION OF THE DRAWINGS

This and other features of the invention will become more apparent from the following detailed description of a preferred, non-limiting example embodiment of it, with reference to the accompanying drawings, in which.

DETAILED DESCRIPTION OF THE PREFERRED EMBODIMENTS OF THE INVENTION

With reference to the accompanying drawings, the process and apparatus of the invention are used for making eyeglasses frames with in-mould decorated parts. The eyeglasses frame made with the process according to this invention is labelled 1.

The eyeglasses frame 1 to be made has a front rim 2 and a pair of sidepieces 3.

Either or both of these component parts of the eyeglasses frame 1 is/are treated (that is, decorated) with the process of the invention.

Preferably, the eyeglasses frame is made of plastic material.

Figure 1:
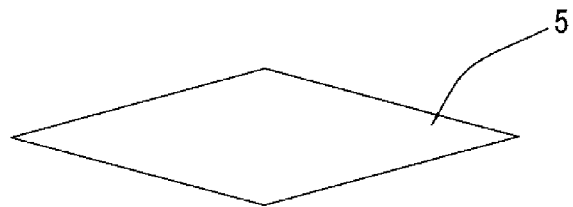
FIGS. 1 and 2 are schematic perspective views illustrating two steps of decorating a film portion forming part of the process according to the invention for making decorated eyeglasses frames.

The process for making the eyeglasses frame 1 comprises the following steps:
  decorating a film (see FIGS. 1 and 2);
  inserting the film into a mould 4 and injection moulding the front rim 2 and/or the sidepieces with the film applied to thereto.

This manufacturing technique is known as "in mould labelling", or "IML".

Decorating the film preferably comprises preparing a transparent film and subjecting it to a decorating process, preferably sublimation, or, alternatively, digital printing, screen printing or other known techniques.

It should be noted, however, that according to the invention the step of decorating the film might also comprise a film (mass) dyeing process, for example during the step of forming the film itself (by extrusion). Preferably, the colour used for this decoration is different from the one used for the eyeglasses frame (that is, for the front rim and the sidepieces).

According to the invention, the process comprises, before at least a step of injection moulding the front rim 2 and/or the sidepieces 3, steps of thermoforming and trimming the film to shape the film 5 according to a predetermined profile corresponding to a wall 7 delimiting the moulding cavity of the mould 4 in which the film 5 is inserted.

In the preferred embodiment illustrated, the film 5 inserted in the mould 4 is shaped like a surface of the front rim 2 and/or of the sidepieces 3 to be formed.

In a variant embodiment (not illustrated), the film 5 is shaped according to a profile defined by a surface of a first layer of the front rim or of the sidepieces made (beforehand) in a first moulding step.

In this case, the first layer of the front rim and/or of the sidepieces is made and inserted in the mould. After that, the film 5 decorated and shaped (that is to say, thermoformed and trimmed) is positioned on the first layer.

Lastly, in a second moulding step, the front rim and/or the sidepieces is/are completed in such a way that the decorated film 5 is incorporated in the front rim and/or the sidepieces, interposed between the first layer and the second.

Preferably, the step of thermoforming and trimming occurs before the step of inserting the film 5 in the mould 4.

Preferably, the film is heated to a temperature of approximately 100-160° C.

Preparation by thermoforming and shaping the piece of film allows forming of the portion of film in order to adapt it to the shape of the mould which is, in any case, not flat.

Thermoforming and trimming also produce a portion of film which is free of irregularities and which, at the end, gives a ready finished eyeglasses frame in the mould, eliminating the need for subsequent machining to give it the right shape on the frame side.

Preferably, the step of thermoforming the film 5 is performed after the step of decorating the film.

Preferably, the piece of decorated film 5 is made of plastic material, like the eyeglasses frame 1.

According to the invention the thermoforming step comprises the steps of (see FIGS. 3 to 6):

preparing a contact element 6 shaped according to a predetermined profile (that is to say, shaped to match the wall 7 of the mould 4 on which the film is positioned for moulding);

positioning a piece of film 5 on the contact element 6 to form it (that is, to give it a desired shape).

Next, the selfsame film 5 is shaped by trimming the parts of the piece of film 5 projecting past the edges of the contact element 6.

Preferably, during the step of forming the piece of film 5 positioned on the contact element 6, the film portion 5a that is in contact with the contact element 6 is heated by irradiation at least of the shaped film portion 5a.

Preferably, the process comprises a step of cooling the contact element 6 during the step of thermoforming the piece of film.

This step makes it possible to control the temperature of the piece of film 5 and to return it more quickly to a less malleable state so as to avoid excessive dimensional variations of the film itself.

More specifically, the piece of film 5 is positioned on the shaped contact element 6 as a "negative", that is a cast of the rim 2 or of the sidepieces 3 to be decorated.

Preferably, the contact element 6 is slightly larger in extension than the wall 7 of the mould 4 to be lined, in order to take into account the fact that cooling the piece of film 5 after thermoforming causes film shrinkage.

In light of this, it should be noted that the apparatus preferably comprises a first contact element 61 and a second contact element 62.

The first contact element 61 is adapted to support the piece of film 5 so as to allow it to be thermoformed. It therefore defines a surface against which the film 5 is stretched and made to adhere and, at the same time, heated in order to thermoform it.

The first contact element 61 is preferably male (but it might also be female).

Whatever the case, it is shaped according to a predetermined profile to be imparted to the film by thermoforming The second contact element 62 is adapted to support the piece of film 5 (already thermoformed) to enable it to be trimmed. It therefore defines a surface against which the film 5 is made to adhere and held during trimming.

The second contact element 62 is preferably male (but it might also be female).

Figure 9:
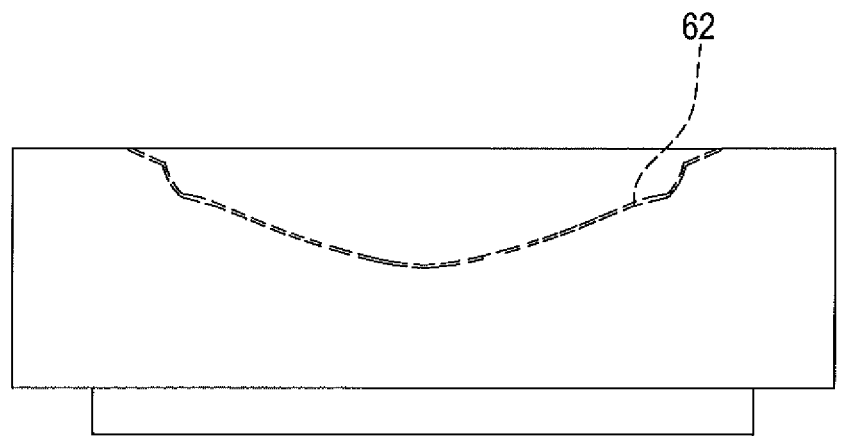
FIG. 9 is a lateral cross section of a detail of the apparatus according to the invention showing in particular a station for trimming the shaped film portion.
Figure 10:
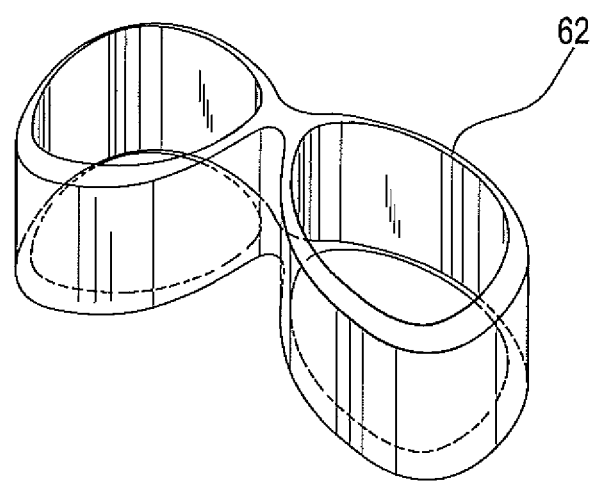
FIG. 10 is a perspective view illustrating a variant embodiment of the detail of FIG. 9.
Figure 11:
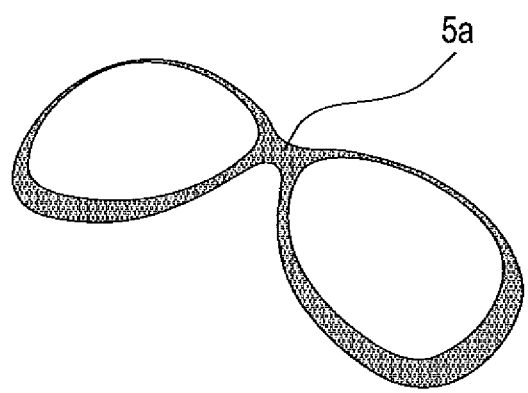
FIG. 11 is a perspective view illustrating the shaped and trimmed decorated film portion obtained with the process and apparatus of the invention.
Figure 12:
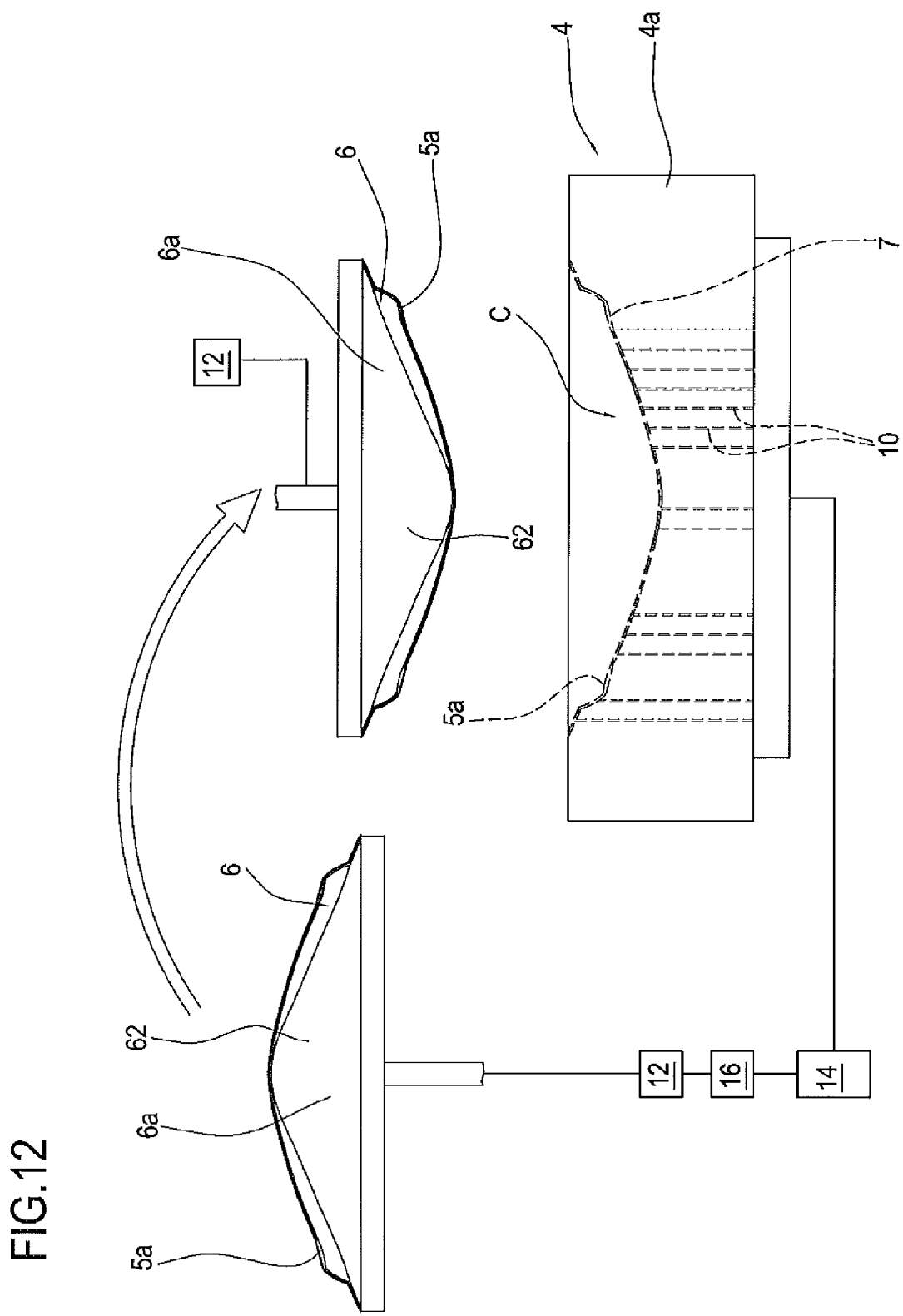
FIG. 12 is a schematic side view illustrating two further steps of the process according to the invention, that is to say, moving a shaping element with the decorated and trimmed film towards a mould and placing the film on a bottom wall of the mould.
Figure 13:
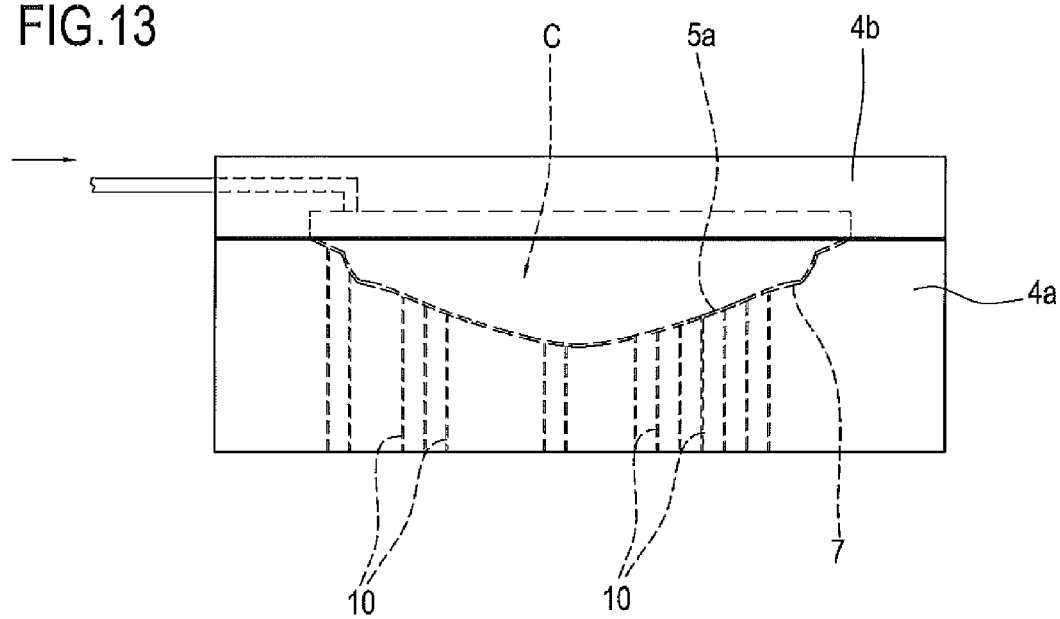
FIG. 13 is a schematic side view illustrating a closed mould for forming decorated eyeglasses frames with the decorated film inserted inside the mould.
Figure 14:
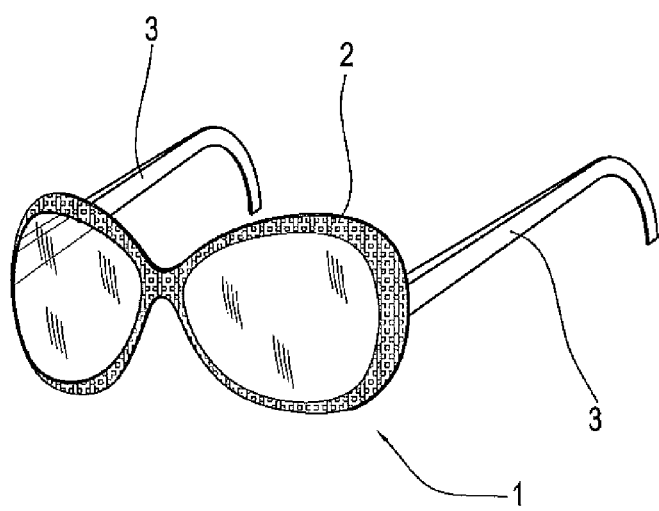
FIG. 14 illustrates a decorated eyeglasses frame obtained with the process and apparatus of the invention.

An example of a male second contact element 62 is illustrated in FIG. 10. An example of a female second contact element 62 is illustrated in FIG. 9.

Whatever the case, the second contact element 62 is shaped like the first contact element 61 (according to the first predetermined profile) but is slightly smaller in size (for example, smaller by a quantity variable from 0.1% to 5%).

More specifically, the first contact element 61 and the second contact element 62 are shaped to match the wall 7 of the mould 4. The second contact element 62 is the same size as the wall 7 of the mould 4, whilst the first contact element 61 is slightly larger than the wall 7 of the mould 4.

It should be noted that the wall 7 of the mould is the wall on which the thermoformed, trimmed film 5 is rested inside the mould 4. The wall 7 may be the surface of one of the half-shells of the selfsame mould 4 or, alternatively, the surface of a first layer of the front rim and/or of the sidepieces, the first layer being previously formed and positioned on the half-shell of the mould 4 when the film 5 is inserted.

Preferably, a predetermined length of time passes between the thermoforming step and the trimming step so as to allow for shrinkage due to cooling of the thermoformed material of the film 5.

Figure 4:
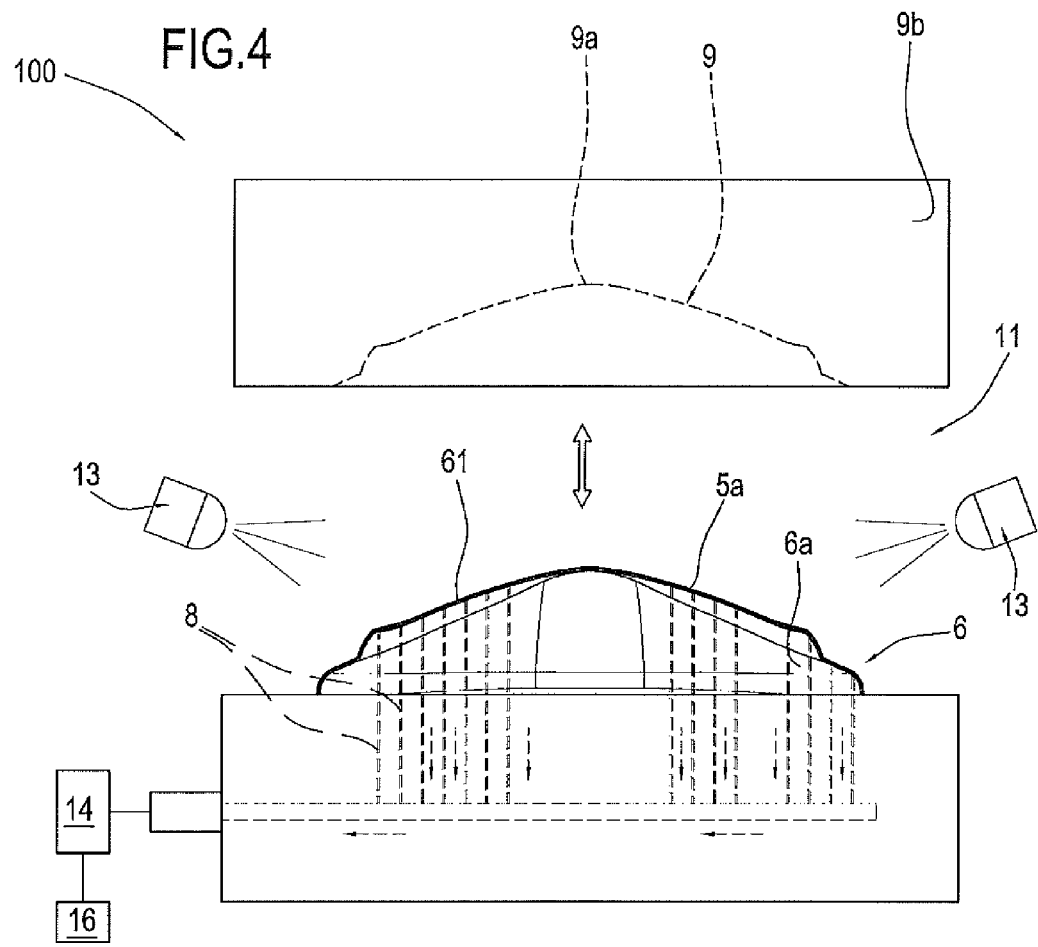
FIG. 4 is a schematic side view, with some parts cut away in order to better illustrate others, of the forming station of FIG. 3.
Figure 5:
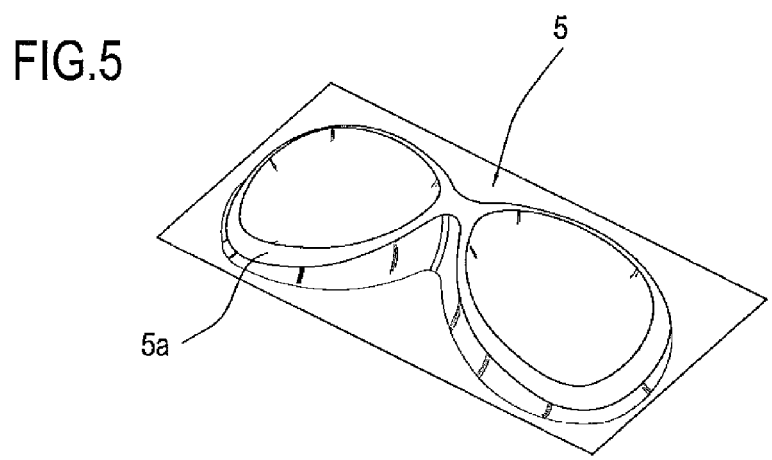
FIG. 5 illustrates in a perspective view the shaped film portion after thermoforming.

Heating the piece of film 5 serves to make it more deformable so it can be stretched into shape and then made to adhere better to the surface of the contact element 6 whose shapes are not flat (see FIGS. 4 and 5).

The thermoforming and shaping of the film portion 5 on a contact element 6, preferably before inserting the piece of film 5 into the mould 4, simplifies the operations of moulding the eyeglasses frame 1 and provides a ready finished eyeglasses frame in the mould, while also preventing risks of damaging the film during finishing of the eyeglasses frame 1.

Preferably, the film 5 is made in a different colour from the colour in which the front rim 2 and/or the sidepieces 3 of the eyeglasses frame 1 are made.

Preferably, the step of decorating the film 5 is performed at high resolution.

This treatment prevents alteration of the decoration or colour due to the stretching the film is subjected to during thermoforming.

Figure 2:
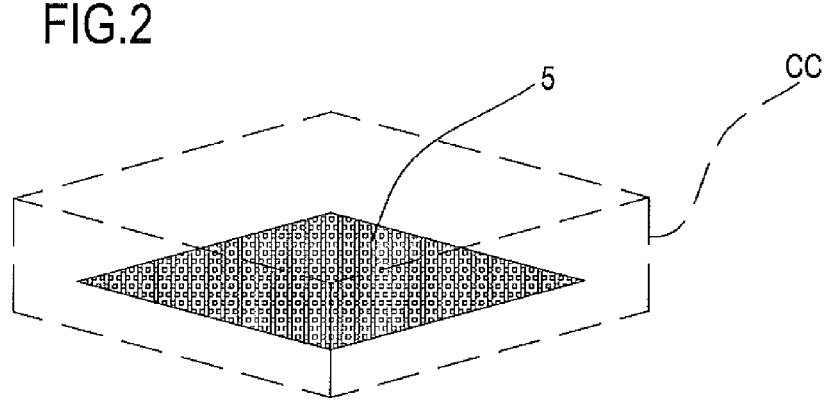

Preferably, the step of decorating the film is accomplished by a sublimation treatment (FIG. 2).

Preferably, the piece of film 5 is placed in a sealed chamber CC (for example, partly covered by a stencil) with a block of pigment and the chamber then brought to the required temperature.

Preferably, sublimation occurs in a temperature range of 100-160° C.

More specifically, the sublimation treatment performed on the film in order to decorate it produces an effect of transparency on the finished eyeglasses frame 1.

Preferably, the step of positioning and forming the piece of film 5 on the contact element 6 is accomplished by the action of forming and retaining the piece of film 5 on the contact element 6 itself, depending on the type of contact element used.

In the examples illustrated (FIGS. 4 and 10), the contact element consists of a punch 6 (that is, a first punch for the first member 61 of the contact element, and a second punch for the second member 62 of the contact element). Thus, hereinafter, specific reference is made to a punch but without thereby limiting the scope of this patent document.

Figure 3:
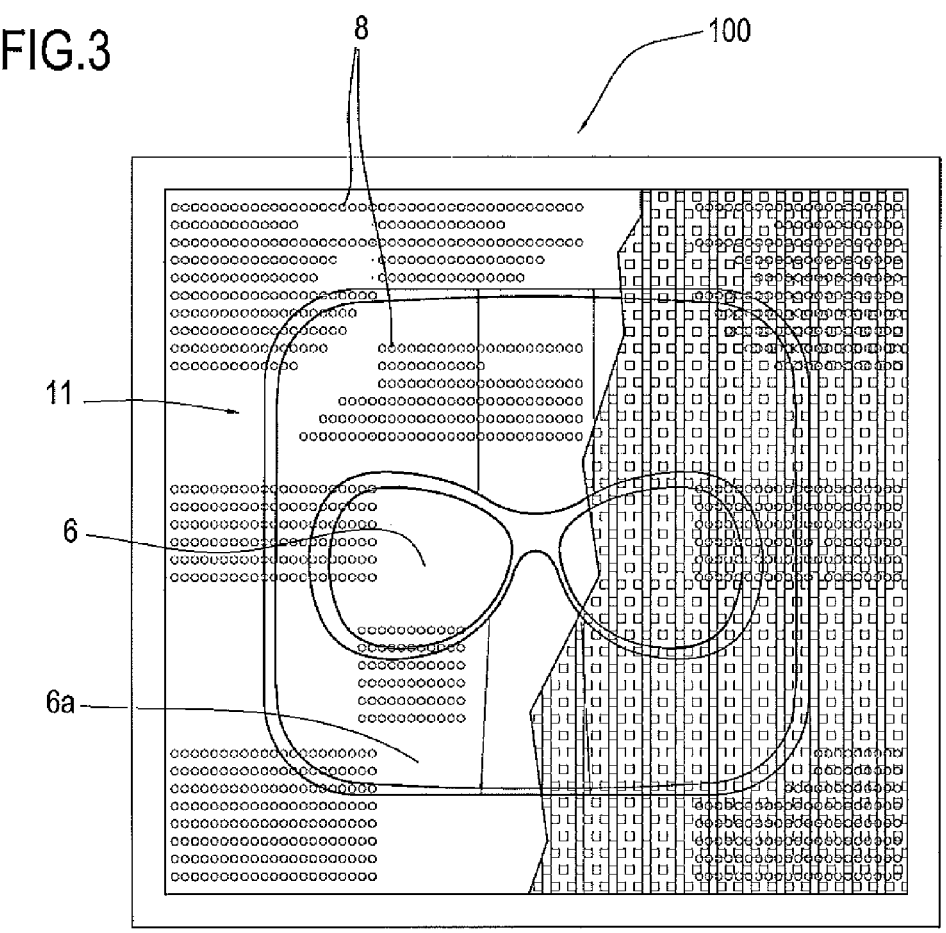
FIG. 3 illustrates a forming station on which the shaped decorated film is thermoformed according to the process and apparatus of the invention; the drawing is a schematic plan view with some parts cut away in order to better illustrate others.

In light of this, the step of holding down (and stretching) the portion of film 5 on the punch 6 is performed preferably by generating a negative pressure through suction channels 8 made in the punch 6 to guarantee effective adherence of the piece of film 5 to the punch 6 itself (see FIGS. 3 and 4).

Alternatively or in addition, the step of holding down (and stretching) the portion of film 5 on the punch 6 is performed by pressure, by blowing gas on the film in such a way as to give it the shape of the punch.

As already mentioned, the process of the invention also comprises a step, performed by trimming means 9, of trimming the parts of the piece of film 5 which project past the edges of the punch 6 (that is, past the edge of the second member 62 of the contact element).

In light of this, the piece of film 5 is trimmed so as to leave only the shaped film portion 5a (see FIG. 5) adhering to the punch 6 to line the wall 7 of the mould 4.

Preferably, the piece of film 5 is trimmed so as to leave a film portion 5a with a slightly larger surface in order to be able to also cover an edge and part of the sidewall of the front rim 2 or of the sidepieces 3. The process of the invention also comprises a step of releasing the shaped film portion 5a from the punch 6 to the wall 7 of the mould 4.

In the case illustrated and by way of an example only, the wall to be lined with the shaped film portion 5a is a bottom wall of the mould 4.

Preferably, the part of the mould 4 with the bottom wall 7 is provided with suction ducts 10 leading out of the wall 7 itself in order to guarantee the adherence of the shaped film portion 5a to the bottom wall 7.

Alternatively (or in addition), the adherence of the film to the mould wall is guaranteed by an electrostatic charge or by a mechanical fixing means.

Figure 6:
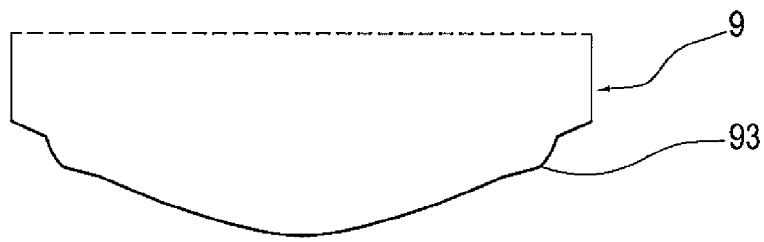
FIG. 6 is a side view of trimming means according to this invention.

The process further comprises a step of automated transporting of the punch 6 with the shaped film portion 5a on it from a forming station 11 to the mould 4 by manipulating means 12 (see FIG. 6).

Preferably, the above mentioned step of heating the piece of film 5 for thermoforming and shaping it on the punch 6 is performed by irradiation from heat sources directed, as mentioned, at the piece of film 5 positioned on the punch 6 (said heat sources are comprised in said thermoforming means 13).

This invention also provides an apparatus, denoted in its entirety by the numeral 100, for making eyeglasses frames 1 having a front rim 2 and a pair of sidepieces 3 and where either the former or the latter, or both, is/are decorated with film.

The apparatus comprises a decorating chamber CC (see FIG. 2) and a mould 4 composed of two parts 4a and 4b which can be coupled to each other to make a moulding cavity C.

The cavity C comprises a wall 7 on which the piece of film 5 to be applied to the front rim 2 or to the sidepieces 3 is positioned (see FIG. 6).

According to the invention, the apparatus 100 comprises a forming station 11 for forming the piece of film 5 and equipped with thermoforming means 13 operating on the piece of film 5 before the film 5 is placed in the mould 4.

The thermoforming means 13 operate on the piece of film 5 to form it according to a profile corresponding to the wall 7 of the mould 4 in such a way that the piece of film 5 inserted in the mould 4 is given the shape of a surface of the front rim 2 and/or of the sidepieces 3 to be formed.

Preferably, the forming station 11 receives the piece of film 5 from the decorating station CC so that thermoforming is performed on a piece of film 5 that is already decorated.

Still more preferably, the forming station 11 is interposed between the decorating station CC and the mould 4.

According to the invention, the forming station 11 comprises a punch 6 for shaping the piece of film 5.

The punch 6 is shaped to match the wall 7 of the mould 4 so as to position in the mould 4 a shaped portion 5a of the piece of film 5.

In light of this, the punch 6 comprises a central die 6 which can be coupled to a supporting matrix 6a: that way, only the central die 6 of the punch need be changed according to the design of the eyeglasses frame to be decorated.

Preferably, the thermoforming means 13 (in particular the heating means of the thermoforming means 13) comprise light sources for thermoforming the decorated piece of film 5 by irradiation.

Still more preferably, the thermoforming means 13 (see FIG. 4) are heat emitting lamps.

Also according to the invention, the forming station 11 comprises means 9 for trimming the parts of the film projecting past the edges of the shaping punch 6 (see broken line in FIG. 4).

That way, only the shaped film portion 5a remains on the central die 6 (see FIG. 5).

Preferably, the trimming means 9 comprise a female die 9a of the punch 6 with cutting perimeter edges.

It should be noted that the trimming means are configured to trim the film portion 5a along a three-dimensional trimming line.

In the example in FIG. 4, the trimming means have a female shape and act in conjunction with the contact element 6 which, in this case, defines both the first contact element and the second.

Figure 7:
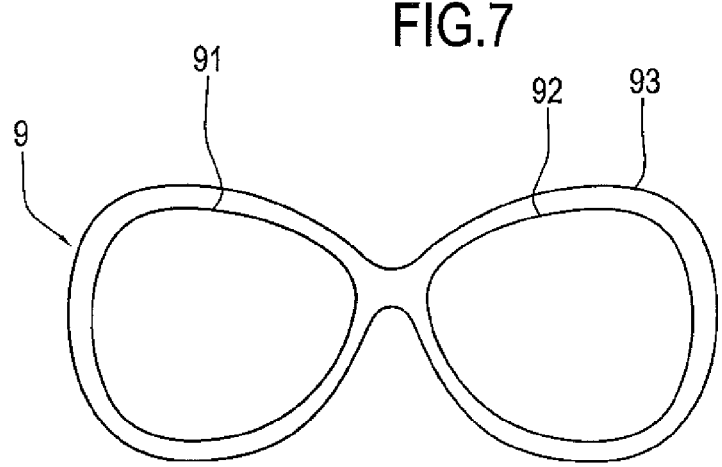
FIG. 7 illustrates the trimming means of FIG. 6 in a view from below.
Figure 8:
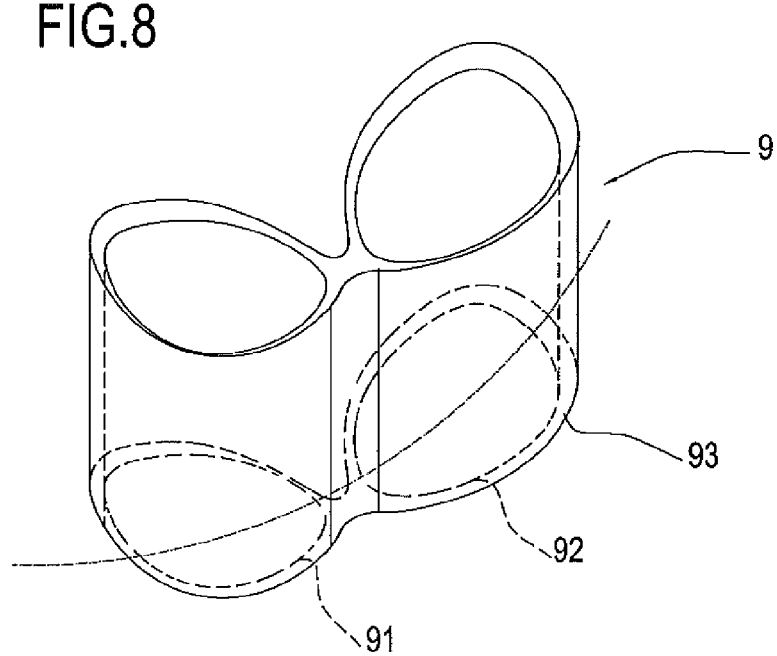
FIG. 8 illustrates the trimming means of FIG. 6 in a perspective view.

In the preferred embodiment illustrated in FIGS. 6, 7 and 8, on the other hand, the trimming means consist of male shaped blades acting in conjunction with the second contact element 62. More specifically, the second contact element 62 and the blades fit together snugly.

In this embodiment, the trimming means 9 comprise three knives.

A first knife 91 and a second knife 92 have blades which define a first and a second closed trimming line, respectively.

A third knife 93 has a blade which defines a third closed trimming line which surrounds the first and second trimming lines of the first and second knives 91 and 92.

This allows trimming of the portion of film 5 which will decorate the front rim.

Alternatively, other cutting technologies might be used (for example, milling, water jet, laser, plasma, or ultrasound) without thereby limiting the scope of the inventive concept.

In light of this, the female die 9a is obtained on a plate 9b facing the top of the punch 6 and movable towards and away from the punch 6 itself.

Preferably, the punch 6 is provided with means 8 for forming and holding down the shaped and decorated film portion 5a.

In light of this, the hold-down and forming means comprise suction channels 8 connected to means 14 for generating a negative pressure for guaranteeing the adherence of the shaped film portion 5a to the punch 6.

Preferably, the wall 7 of the mould 4 is provided with means 10 for holding down the decorated piece of film 5.

The wall 7 of the mould 4 is, in this case, defined by the bottom wall of the lower mould part 4a.

In light of this, the means for holding down and forming the shaped and decorated film portion 5a on the bottom wall 7 comprise suction channels 10 connected to means 14 for generating a negative pressure for guaranteeing the adherence of the shaped film portion 5a to the bottom wall 7 itself.

More specifically, the channels 10 are made in the lower part 4a of the mould 4.

Alternatively, other hold-down technologies might be used, such as, for example, mechanical means or means that generate electrostatic charges, without thereby limiting the scope of the inventive concept.

The electrostatic charge is generated by a device for generating a high-voltage discharge in order to charge the surface of the film electro statically.

Alternatively, the formed and shaped film can be held in position on the mould by mechanical means, such as plates, for example, which operate on the film.

Also according to the invention, the apparatus 100 comprises means 12 for manipulating the punch 6 in order to automate the transporting of the shaped film portion 5a applied to the punch 6 from the forming station 11 to the mould 4.

In light of this, the manipulating means 12 comprise a gripping and handling unit (represented schematically in FIG. 6) for picking up the punch 6 from the forming station 11 and carrying it to the mould 4 where it allows the shaped film portion 5a to be released on the bottom wall 7.

Preferably, the manipulating means lift the punch 6 from the forming station 11 turn it through 180° to position the shaped film portion 5a over the bottom wall 7 and lower the punch 6 into the mould part 4a where they release the shaped film portion 5a.

Preferably, the apparatus 100 comprises a control unit 16 (illustrated as a block in the accompanying drawings) connected to the manipulating means 12 and to the means 14 for generating a negative pressure both of the punch 6 and of the mould 4.

The control unit 16 is programmed to coordinate the movement of the punch 6 (or even just the central die of the punch 6) from the forming station 11 to the mould 4 and to switch on/off the means 14 for generating the negative pressure on the punch 6 and on the bottom wall 7 of the mould 4 so as to allow the shaped film portion 5a to be held down or released according to the operation to be performed.

This invention also provides a decorated eyeglasses frame having a front rim 2 and a pair of sidepieces 3 (see FIG. 7) made using the process and apparatus just described.

This invention therefore fully achieves the preset aims thanks to the use, on eyeglasses frames, of a piece of film with a high-resolution decoration obtained by a sublimation treatment.

These treatments, unlike treatments such as screen printing or electronic printing, make it possible to obtain a decoration in a simple and effective manner.

To this must be added the fact that the film decorated and thermoformed for use, according to the invention, in an in mould labelling (IML) process has the following advantages:

producing an effect of transparency on the eyeglasses frame by an in-mould overmoulding combination of the same material and sublimed film;

not having to protect and decorate the moulded eyeglasses frame with a protective coating after injection moulding;

making the decoration resistant to subsequent machine operations of tumbling and etching the eyeglasses frame;

obtaining an aesthetic aspect similar to that of an acetate sheet;

obtaining eyeglasses that are ready decorated when they reach the press;

obtaining high-quality decorations even on eyeglasses frames with complexly curved front rims or complex construction architectures.

The invention claimed is:

1. A process for making an eyeglasses frame (1), where at least one front rim (2) or a pair of sidepieces (3) of the eyeglasses frame (1) is decorated, comprising the following steps:
    (a) decorating a film (5);
    (b) placing the film (5) on a first contact element (61), which is shaped to match the wall (7) of the mold (4) and slightly larger in size, and thermoforming the film (5);
    (c) removing the thermoformed film from the first contact element (61) and placing the film (5) on a second contact element (62) which (a) is different from the first contact element (61) and (b) is shaped to match the wall (7) of the mold (4) and equal in size, and trimming the film while the film is on the second contact element (62);
    (d) inserting the trimmed film into the mold (4) and injection molding the front rim (2) and/or the sidepieces (3) with the film applied thereto, wherein the film (5) inserted in the mold (4) is formed and shaped according to a profile corresponding to the wall (7) of the mold (4) and is also formed and shaped like a surface of the front rim (2) and/or of the sidepieces (3) to be formed.

2. The process according to claim 1, comprising a step of injection molding a first layer of the front rim (2) and/or of the sidepieces (3) without the film (5), wherein the decorated, thermoformed and trimmed film (5) is inserted in the mold (4) and rested on the previously formed first layer of the front rim (2) and/or of the sidepieces (3), the wall (7) of the mold (4) being thus defined by the first layer of the front rim (2) and/or of the sidepieces (3) so that, after molding, the film is interposed between two different layers of the front rim (2) and/or of the sidepieces (3).

3. The process according to claim 1, wherein the thermoforming step comprises the following steps:
    preparing a contact element (6) shaped to match the wall (7) of the mold (4);
    positioning a piece of film (5) on the contact element (6) in order to form it and shaping the piece of film (5) by trimming the parts of the piece of film (5) projecting past the edges of the contact element (6).

4. The process according to claim 3, comprising, during the step of forming the piece of film (5) positioned on the contact element (6), a step of heating a film portion (5a) that is in contact with the contact element (6) by irradiation of the film portion (5a).

5. The process according to claim 1, wherein the film (5) is made in a different color from the color in which the front rim (2) and/or the sidepieces (3) of the eyeglasses frame (1) are made.

6. The process according to claim 1, wherein the film (5) is trimmed along at least one three-dimensional trimming line.

7. The process according to claim 6, wherein the film (5) is trimmed along three three-dimensional trimming lines, where a first and a second closed trimming line are surrounded by a third closed trimming line.

8. The process according to claim 1, wherein the step of decorating the film (5) is accomplished by a sublimation treatment.

9. The process according to claim 1, comprising a step of releasing the film from the second contact element (62) to the wall (7) of the mold (4).

10. The process according to claim 1, wherein a predetermined length of time passes between the thermoforming step and the trimming step so as to allow for shrinkage due to cooling of the thermoformed material of the film (5).

11. An apparatus for making eyeglasses frames (1) having a front rim (2) and a pair of sidepieces (3) where the front rim (2) and/or the sidepieces (3) is/are decorated, comprising:
a station (CC) for decorating a film (5);
a mold (4) for injection molding of the eyeglasses frame (1), the mold (4) being composed of two parts (4a, 4b) which can be coupled to each other to make a molding cavity (C) having a wall (7) on which the film (5) to be applied to the front rim (2) or to the sidepieces (3) is positioned, wherein the apparatus further comprises:
a film forming and trimming station (11) equipped with means (13) for thermoforming the film (5) for forming a piece of film (5) according to a profile corresponding to the wall (7) of the mold (4);
shaping means (6, 9) configured to give the piece of film (5) the shape of a surface of the front rim (2) and/or of the sidepieces (3) to be formed, before injection in the mold;
a first contact element (61) which is shaped to match the wall (7) of the mold (4) and slightly larger in size and which is configured to receive and support the film (5) during thermoforming;
a second contact element (62) which is different from the first contact element (61) and which is shaped to match the wall (7) of the mold (4) and equal in size and which is configured to receive and support the previously thermoformed film (5) and to act in conjunction with trimming means (9) to trim the film.

12. The apparatus according to claim 11, wherein the forming and trimming station (11) comprises:
at least one contact element (6) for shaping the piece of film (5); the contact element (6) being shaped to match the wall (7) of the mold (4) so as to position in the mold (4) a shaped portion (5a) of the piece of film (5);
means (9) for trimming the parts of the film projecting past the edges of the contact element (6) in order to give the film a final shape.

13. The apparatus according to claim 11, wherein the trimming means are configured to trim the film portion (5a) along a three-dimensional line.

14. The apparatus according to claim 13, wherein the trimming means comprise three knives, wherein a first knife and a second knife have blades which define a first and a second closed trimming line, respectively, and a third knife has a blade which defines a third closed trimming line surrounding the first and second closed trimming lines.

15. The apparatus according to claim 11, wherein the wall (7) of the mold (4) is equipped with means (10) for holding down a shaped film portion (5a), the means (10) comprising suction channels (10) connected to means for generating a negative pressure to guarantee the adherence of the shaped film portion (5a) to the wall (7).

16. The apparatus according to claim 11, comprising a control unit (16) which is connected to manipulating means (12) and to a means (14) for generating a negative pressure and which is programmed to coordinate the movement of a contact element (6) from the film forming and trimming station (11) to the mold (4) with the switching on/off of the means for generating the negative pressure on the contact element (6) and on the wall (7) of the mold (4).

17. A decorated eyeglasses frame having a front rim (2) and a pair of sidepieces (3) and made using the process according to claim 1.

18. A decorated eyeglasses frame having a front rim (2) and a pair of sidepieces (3) and made with the apparatus according to claim 11.

* * * * *